United States Patent [19]

Treinies et al.

[11] Patent Number: 5,448,976
[45] Date of Patent: Sep. 12, 1995

[54] METHOD FOR SUPPRESSING VIBRATIONS IN THE DRIVE TRAIN OF A MOTOR

[75] Inventors: Stefan Treinies, Neutraubling; Manfred Wier, Wenzenbach, both of Germany

[73] Assignee: Siemens Aktiengesellschaft, Munich, Germany

[21] Appl. No.: 127,234

[22] Filed: Sep. 27, 1993

[30] Foreign Application Priority Data

Sep. 25, 1992 [DE] Germany .............. 42 32 204.9

[51] Int. Cl.$^6$ ............................................. F02P 5/145
[52] U.S. Cl. ................................... 123/419; 123/436
[58] Field of Search ................. 123/419, 425, 436

[56] References Cited

U.S. PATENT DOCUMENTS

| | | | |
|---|---|---|---|
| 4,799,469 | 1/1989 | Nagano et al. ............ | 123/419 X |
| 4,852,537 | 8/1989 | Nagano et al. ............ | 123/419 |
| 4,949,691 | 8/1990 | Abe et al. ................. | 123/419 |
| 5,069,183 | 12/1991 | Nagano et al. ............ | 123/419 |

FOREIGN PATENT DOCUMENTS 3717368  4/1988  Germany .
4009791 10/1991  Germany .
4009792 10/1991  Germany .

*Primary Examiner*—Willis R. Wolfe
*Attorney, Agent, or Firm*—Herbert L. Lerner; Laurence A. Greenberg

[57] ABSTRACT

A method for suppressing vibration in the drive train of a motor vehicle includes detecting an rpm of a vehicle engine; deriving an rpm gradient from the rpm and evaluating the rpm gradient; and reducing torque of the engine by varying an ignition angle if impermissible vibration is detected, wherein the torque reduction is controlled as a function of an upper and a lower limit value for the rpm gradient. The ignition angle is retarded if the rpm gradient drops below the lower limit value; switching back to an initial performance graph takes place if the rpm gradient exceeds the upper limit value; and the upper and the lower limit values are predetermined as a function of the engine rpm.

8 Claims, 1 Drawing Sheet

METHOD FOR SUPPRESSING VIBRATIONS IN THE DRIVE TRAIN OF A MOTOR

BACKGROUND OF THE INVENTION

Field of the Invention

The invention relates to a method for suppressing vibration in the drive train of a motor vehicle, in which the rpm of the vehicle engine is detected, the rpm gradient is derived from the rpm and evaluated, and if impermissible vibration is detected, the torque of the engine is reduced by varying the ignition angle, wherein the torque reduction is controlled as a function of an upper and a lower limit value for the rpm gradient.

A method which is known from German Published, Non-Prosecuted Application DE 40 09 791 A1 is used to suppress vibrations in the drive train of a motor vehicle having an engine rpm which is detected by a sensor.

When vibration occurs in the drive train, a correcting variable ascertained in a correcting device is delivered to the engine and reduces the engine torque by varying the instant of ignition. The instant of ignition is varied, for instance, by switching over from a first ignition performance graph to a second one in an ignition control unit.

Vibration in the drive train of a motor vehicle, which is caused by a load change in the drive and by road surface factors while driving, is rpm-dependent. The vibration, which can also be called bucking, can above all occur at an abrupt transition from low partial load to full load in the rpm range, in other words above all during the startup process.

SUMMARY OF THE INVENTION

It is accordingly an object of the invention to provide a method for suppressing vibrations in the drive train of a motor vehicle, which overcomes the hereinafore-mentioned disadvantages of the heretofore-known methods of this general type and which takes the rpm dependency of the tendency toward vibration into account.

With the foregoing and other objects in view there is provided, in accordance with the invention, a method for suppressing vibration in the drive train of a motor vehicle, which comprises detecting an rpm of a vehicle engine; deriving an rpm gradient from the rpm and evaluating the rpm gradient; reducing torque of the engine by varying an ignition angle if impermissible vibration is detected; and controlling the torque reduction as a function of an upper and a lower limit or threshold value for the rpm gradient by retarding the ignition angle if the rpm gradient drops below or fails to attain the lower limit value; switching back to a first or initial performance graph if the rpm gradient exceeds the upper limit value; and predetermining the upper and the lower limit values as a function of the engine rpm.

In accordance with another mode of the invention, there is provided a method which comprises switching over to another ignition performance graph effecting a reduced engine torque, if the rpm gradient drops below or fails to attain the lower limit value; and switching back to the first or initial performance graph, if the rpm gradient exceeds the upper limit value.

In accordance with a further mode of the invention, there is provided a method which comprises adjusting an amount of retardation of the angle, in dependence on the rpm.

In accordance with an added mode of the invention, there is provided a method which comprises setting the lower limit value to higher values and setting the upper limit value to lower values at higher rpm, than at lower rpm.

In accordance with an additional mode of the invention, there is provided a method which comprises retarding the adjustment of the ignition angle by a predetermined period of time.

In accordance with yet another mode of the invention, there is provided a method which comprises resetting the ignition angle to an original value after a predetermined maximum time has been exceeded, even if the upper limit value has not been exceeded by the rpm gradient.

In accordance with yet a further mode of the invention, there is provided a method which comprises adjusting the ignition angle with limitation of its speed of change.

In accordance with a concomitant mode of the invention, there is provided a method which comprises setting a minimum ignition angle which is not fallen below, upon the retardation of the ignition angle.

Other features which are considered as characteristic for the invention are set forth in the appended claims.

Although the invention is illustrated and described herein as embodied in a method for suppressing vibrations in the drive train of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENTS

Figure 1:
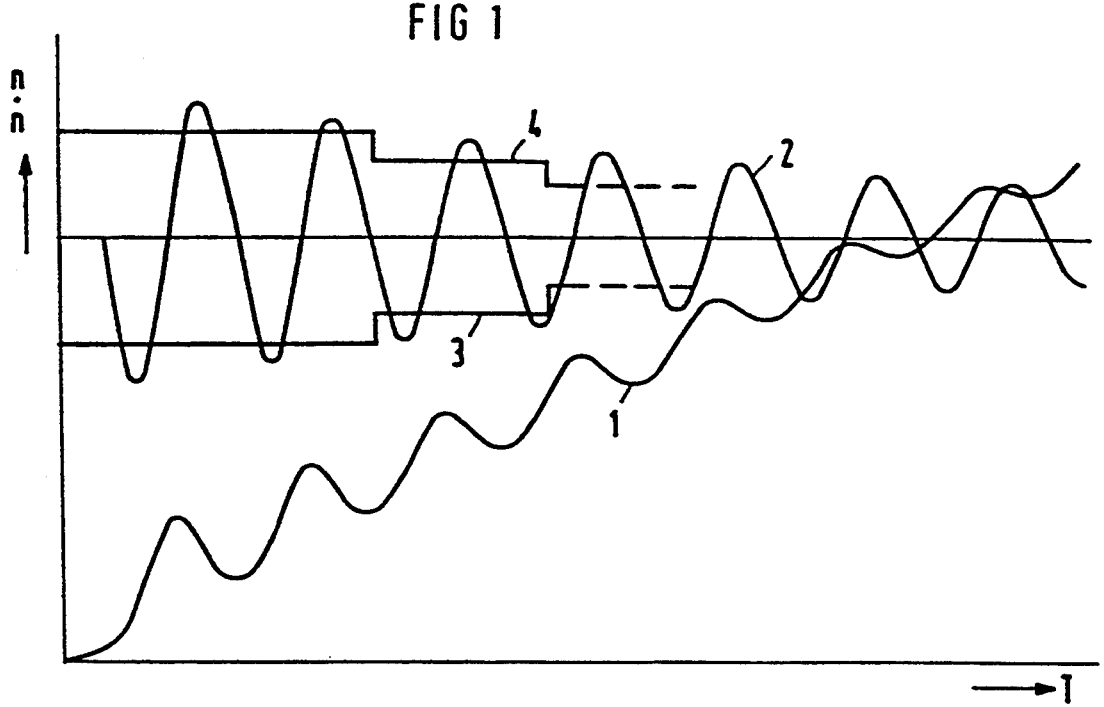
FIG. 1 is a diagram showing the course over time of an engine rpm and of an rpm gradient, that is measured as a segment time gradient, of a motor vehicle during startup.

Referring now to FIG. 1 of the drawing in detail, there is seen an rpm 1 of an engine which rises continuously. However, it can be seen that influences originating in the vehicle drive train cause marked rpm swings, which lead to a known bucking in the drive at low rpm.

In engine control technology, the rpm 1 is typically processed in the form of segment times, which correspond to the angular spacing between two markings on the crankshaft. The measurement is performed, for example, with an inductive sensor 7 that detects the teeth at the periphery of a gear wheel 8 secured to the crankshaft. In a six-cylinder engine, one segment time corresponds to an angle of 120° on a crankshaft KW. With a five-cylinder engine, it corresponds to an angle of 144° KW, and in a four-cylinder engine it corresponds to an angle of 180° KW.

Figure 2:
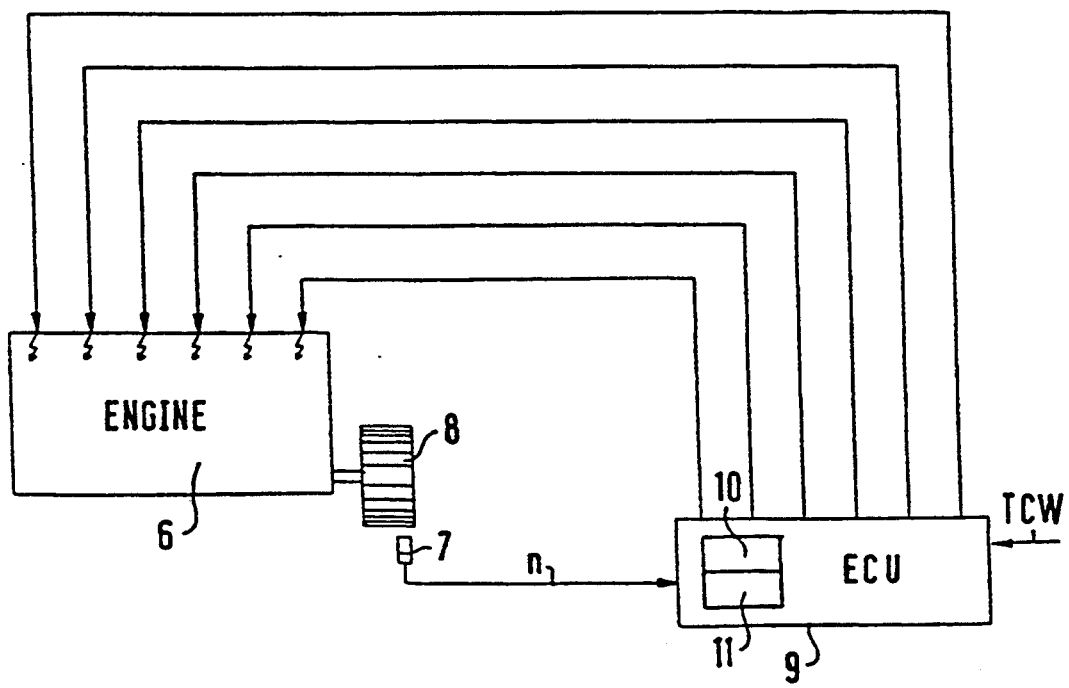
FIG. 2 is a diagrammatic illustration of an ignition control device and its connection with an engine.

With reference to FIG. 2, a 6-cylinder engine 6 is connected to the ignition control unit 9, labelled ECU. The ignition control unit 9 obtains information with regard to the angular speed of the engine through the inductive rpm sensor 7 which scans the corresponding wheel 8 on the crankshaft. The initial performance graph is illustrated at 10 and a second ignition performance graph is indicated at 11. The ignition control unit 9 receives information with regard to the coolant temperature at the input labelled TCW.

A rotary speed 2 of the engine is accordingly derived and processed in the form of a segment time gradient. In the case of these segment time gradients, in the present method, a lower limit or threshold value 3 is defined, in which an "anti-bucking" function is activated, in a manner to be described below. An upper limit value or threshold 4, at which the aforementioned function is ended or deactivated, is also defined for the rpm or segment time gradient.

In normal operation, the ignition angle of the engine is controlled by an ignition control unit in accordance with a first performance graph, in which the basic ignition angle is stored as a function of the rpm and of the aspirated air flow rate. If bucking vibration in the drive train is ascertained, as is to be described below, then in the ignition control unit of the engine a switchover is made to a second ignition performance graph, in which ignition instants that are retarded are stored, again as a function of the rpm and of the air flow rate, which bring about a reduction in engine torque and therefore a damping of the vibration in the drive train.

In order to control the instant of ignition in accordance with the second ignition performance graph, the following conditions must be met:

the coolant temperature must be above a predetermined minimum value, and the engine rpm n must be within a predetermined range.

If the segment time gradient drops below or fails to attain the predetermined lower threshold value 3, then a switchover from the first or basic ignition performance graph to the second ignition performance graph is made, and without carrying out any limitation in the change in ignition angle. Upon activation of the anti-bucking function, that is at the switchover to a second ignition performance graph which produces a reduced engine torque, the speed of ignition angle change is limited to some value.

The switchover to the second ignition performance graph may be delayed by a predeterminable number of segment times or operating cycles of the engine, for example by one to three segment times. One segment time, for a six-cylinder engine at 1200 rpm, corresponds to a duration of approximately 17 msec.

On the other hand, upon activation of the anti-bucking function, the ignition angle can also be adjusted to "late", specifically by an amount that depends on the rpm. Once again, the adjustment takes place with a limitation of the speed of change. In this case, however, the ignition angle must not drop below a minimum angle, because otherwise incomplete combustion could occur, which would damage the catalytic converter, for instance.

If the activation of the anti-bucking function is delayed by several segment times, then the switchover of the ignition performance graph or the retarding of the ignition angle takes place without limitation of the speed of ignition angle change.

If the segment time gradient exceeds the predetermined upper threshold value 4, then the anti-bucking function is ended or deactivated. A switch is made back to the first or basic ignition performance graph, specifically while maintaining the general limitation in ignition angle change.

The upper threshold value is predetermined not in constant fashion but rather as a function of the engine rpm n. In the case of higher rpm, it assumes higher values than at lower rpm. The lower threshold value, which is represented by the line 3 in the drawing, is likewise predetermined as a function of the rpm and at higher rpm it assumes lower values than at low rpm in the region of the startup rpm.

The ending or inactivation of the anti-bucking function may also be delayed, specifically by a predeterminable number of segment times or engine cycles after the upper threshold value is exceeded. If the anti-bucking function has not yet ended after a predetermined maximum time, which is counted from the onset of activation, then it is interrupted and a switchover back to the first performance graph is made, with limitation of the ignition angle change. Or, the ignition angle is advanced again by the rpm-dependent amount, specifically with a limitation of the speed of ignition angle change.

The above-described method for suppressing vibration (so-called bucking) in the drive train in a motor vehicle will be summarized briefly below: The rpm gradient (in the form of a segment time gradient) is derived from the engine rpm n of a motor vehicle. Evaluating this gradient enables recognition of drive train vibration. If the gradient drops below, or fails to attain, a lower limit value, then the ignition angle is retarded, for instance, by switchover from a basic ignition performance graph to a second ignition performance graph, and a reduction in the engine torque is thus effected. If the rpm gradient exceeds an upper limit value, then the ignition angle is advanced again, or a switch back to the basic ignition performance graph is made. The upper and lower limit value are dependent on the engine rpm n, as are the amounts of the ignition angle changes.

We claim:

1. A method for suppressing vibration in the drive train of a motor vehicle, which comprises:

detecting an rpm of a vehicle engine;

deriving an rpm gradient from the rpm and evaluating the rpm gradient;

reducing torque of the engine by varying an ignition angle if impermissible vibration is detected; and controlling the torque reduction as a function of an upper and a lower limit value for the rpm gradient by:

retarding the ignition angle if the rpm gradient drops below the lower limit value;

switching back to an initial performance graph if the rpm gradient exceeds the upper limit value;

predetermining the upper and the lower limit values as a function of the engine rpm; and resetting the ignition angle to an original value after a predetermined maximum time has been exceeded, even if the upper limit value has not been exceeded by the rpm gradient.

2. A method for suppressing vibration in the drive train of a motor vehicle, which comprises:

detecting an rpm of a vehicle engine; deriving an rpm gradient from the rpm and evaluating the rpm gradient;

reducing torque of the engine by varying an ignition angle if impermissible vibration is detected; and controlling the torque reduction as a function of an upper and a lower limit value for the rpm gradient by:
retarding the ignition angle if the rpm gradient drops below the lower limit value;
switching back to an initial performance graph if the rpm gradient exceeds the upper limit value;
predetermining the upper and the lower limit values as a function of the engine rpm; and
setting a minimum ignition angle below which the ignition angle is not retarded in the retarding step.

3. A method for suppressing vibration in the drive train of a motor vehicle, which comprises:
detecting an rpm of a vehicle engine;
deriving an rpm gradient from the rpm and evaluating the rpm gradient;
reducing torque of the engine by varying an ignition angle if impermissible vibration is detected; and
controlling the torque reduction as a function of an upper and a lower limit value for the rpm gradient by:
retarding the ignition angle if the rpm gradient drops below the lower limit value;
switching back to an initial performance graph if the rpm gradient exceeds the upper limit value;
predetermining the upper and the lower limit values as a function of the engine rpm; and
limiting a speed of change with which the ignition angle is adjusted.

4. A method for suppressing vibration in the drive train of a motor vehicle, which comprises:
detecting an rpm of a vehicle engine;
deriving an rpm gradient from the rpm and evaluating the rpm gradient;
reducing torque of the engine by varying an ignition angle if impermissible vibration is detected; and
controlling the torque reduction as a function of an upper and a lower limit value for the rpm gradient by:
retarding the ignition angle if the rpm gradient drops below the lower limit value;
switching back to an initial performance graph if the rpm gradient exceeds the upper limit value;
predetermining the upper and the lower limit values as a function of the engine rpm; and
setting the lower limit value to higher values and setting the upper limit value to lower values at higher rpm, than at lower rpm.

5. The method according to claim 1, which comprises:
switching over to another ignition performance graph effecting a reduced engine torque, if the rpm gradient drops below the lower limit value; and
switching back to the initial performance graph, if the rpm gradient exceeds the upper limit value.

6. The method according to claim 4, which comprises adjusting an amount of retardation of the angle, in dependence on the rpm.

7. The method according to claim 4, which comprises retarding the adjustment of the ignition angle by a predetermined period of time.

8. The method according to claim 4, which comprises adjusting the ignition angle with limitation of its speed of change.

* * * * *

UNITED STATES PATENT AND TRADEMARK OFFICE
CERTIFICATE OF CORRECTION

PATENT NO. : 5,448,976
DATED : September 12, 1995
INVENTOR(S) : Stefan Treinies and Manfred Wier It is certified that error appears in the above—identified patent and that said Letters Patent is hereby corrected as shown below:

In the title, item (54), line 2, after "MOTOR"

add

-- VEHICLE --.

Signed and Sealed this

Twenty-sixth Day of December, 1995

Attest:

BRUCE LEHMAN

*Attesting Officer*    *Commissioner of Patents and Trademarks*